June 29, 1926.

G. P. McDONNELL 1,590,199

APPARATUS FOR REPRODUCING MOTION PICTURES

Filed Feb. 11, 1924

Inventor
George P. McDonnell
By Pepper Kingsland
His Attorneys.

Patented June 29, 1926.

1,590,199

UNITED STATES PATENT OFFICE.

GEORGE P. McDONNELL, OF ST. LOUIS, MISSOURI.

APPARATUS FOR REPRODUCING MOTION PICTURES.

Application filed February 11, 1924. Serial No. 691,921.

This invention relates to improvement in apparatus for reproducing motion pictures.

An object of the invention is to provide an apparatus whereby motion pictures may be filmed and reproduced in such a way as to furnish a prompting film coordinated with the picture representation so that an orator may repeat the words coordinate with the picture reproduction.

The apparatus comprises the structure hereinafter described, reference being made to the accompanying drawing in which—

Figure 1:
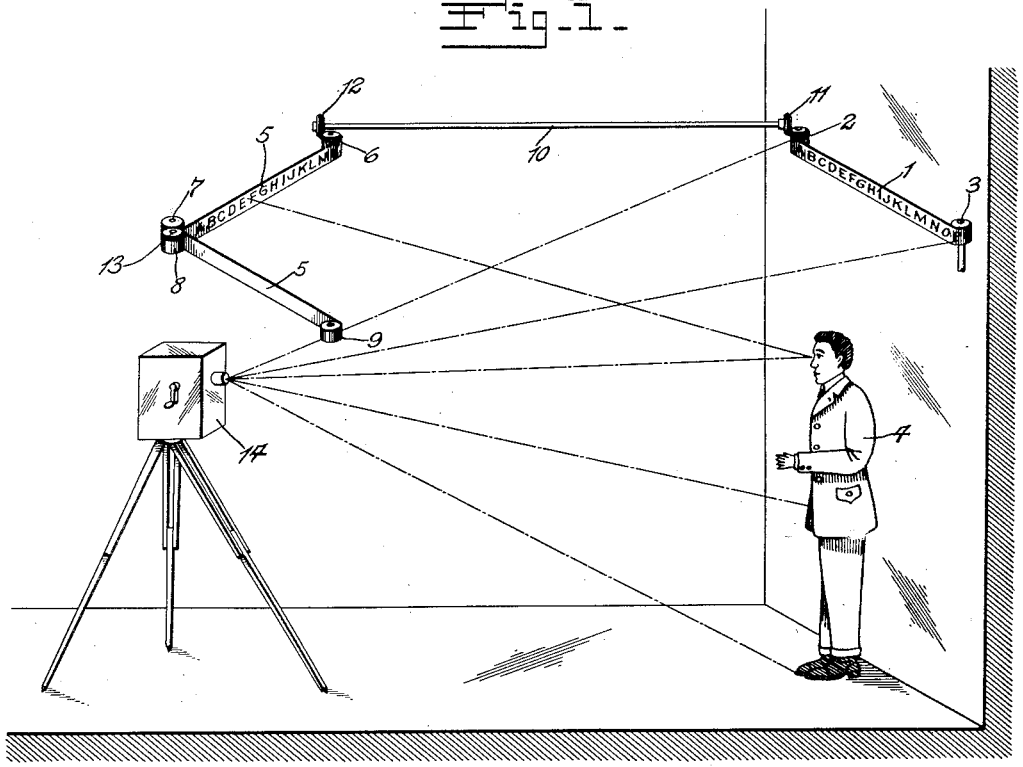
Fig. 1 is a view illustrating the manner in which the film is made for reproduction.
Figure 2:
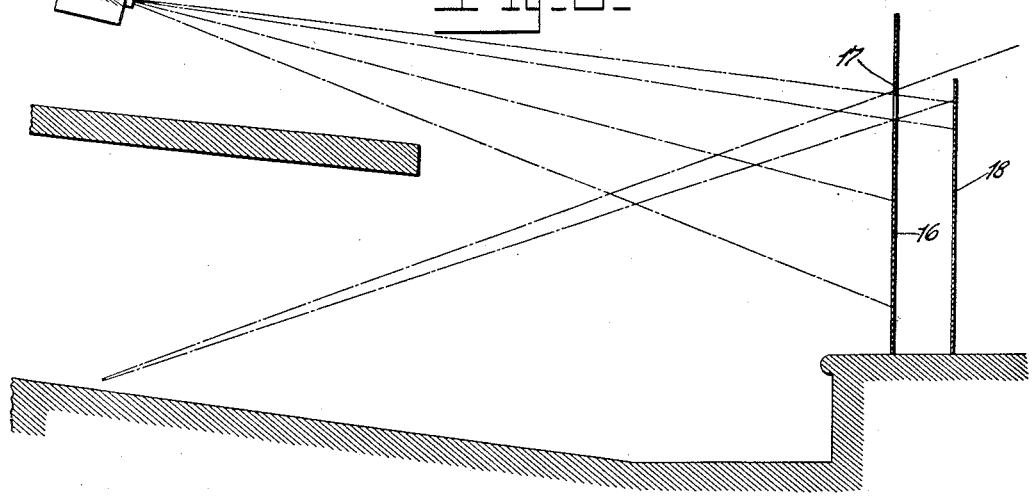
Fig. 2 is a diagrammatic view illustrating the arrangement of the parts including the reproducing camera and screens for the reproduction of the film.

In filming the picture there is provided a film strip 1 arranged to travel across the upper set of the picture. said strip being mounted on rollers 2 and 3 at a point remote from the set and in line of vision of the actor 4, and prompting strips 5 mounted on rollers 6, 7, 8 and 9. By suitable connection between the strip 1 and the strips 5 in the embodiment diagrammatically illustrated, comprising a shaft 10 and beveled gear connections 11 and 12, all of the strips are operated in unison, it being understood that the rolls 7 and 8 are geared together by gear connections 13.

The actor performs the appropriate action coordinated with the words that appear on the several strips 1 and 5 so that, as the action is filmed by the camera 14, there will appear across the film at the top in alinement the same words that constitute the prompting subject matter of the strips 5 as they pass from one roll to the other in the line of vision of the actor.

In reproducing the film the projecting machine 15 is so focused and centered that the picture will be produced on a screen 16 in which there is formed, at the top of the picture, a slit 17. The words appearing across the film are projected through the slit and screened on a screen 18, back of the main screen 16. An orator is positioned between the two screens 16 and 18 and repeats the words as they are reproduced on the supplemental screen 18.

In this manner an extremely realistic production of a talking motion picture is provided as the orator is entirely concealed from view of the audience and has before him the words appropriate to the action of the picture appearing on the main screen. The orator is thus enabled to deliver the spoken words appropriate to the action in exact synchronism with the action of the picture.

While the apparatus has been described as appropriate for a single actor, it will be understood that an action including any number of characters may be filmed by having the prompting strips and reproducing appropriately arranged for each character, and that a number of orators may then reproduce the words appropriate to the action by following their corresponding prompting parts of the strip reproduced on the supplemental screen.

What I claim and desire to secure by Letters Patent is:—

1. The combination with a projecting machine, of a film strip having written subject matter on one marginal edge thereof, and an action picture thereon, said film being adapted to be reproduced by said projecting machine, a pair of spaced screens arranged substantially on the same horizontal plane, the forward one of said screens masking an area of the other, and a portion of the area of the rearward screen being exposed beyond the forward screen, whereby the main action is received upon the forward screen and the written subject matter is projected beyond the forward screen to the rearward screen, said rearward screen being arranged substantially out of view of the audience.

2. The combination with a projecting machine, of a film strip having written subject matter on one marginal edge therof, and an action picture thereon, said film being adapted to be reproduced by said projecting machine, a pair of spaced screens arranged substantially upon the same horizontal plane, one masking the other, said masking screen having a slot therein whereby the main action is received upon the masking screen and the written subject matter is projected through the slot onto the other of said screens, said masked screen being arranged out of view of the audience.

GEORGE P. McDONNELL.